J. N. LANDAU.
AUTOMATIC MULTIPLE CHUCK DRILL PRESS.
APPLICATION FILED MAY 21, 1913.

1,104,517.

Patented July 21, 1914.

WITNESSES
Frank C. Palmer
Edwin Burch

INVENTOR
Joseph N. Landau
BY Munn & Co.
ATTORNEYS

UNITED STATES PATENT OFFICE.

JOSEPH N. LANDAU, OF NEW YORK, N. Y.

AUTOMATIC MULTIPLE-CHUCK DRILL-PRESS.

1,104,517.

Specification of Letters Patent.

Patented July 21, 1914.

Application filed May 21, 1913. Serial No. 768,901.

*To all whom it may concern:*

Be it known that I, JOSEPH N. LANDAU, a citizen of the United States, and a resident of the city of New York, borough of Manhattan, in the county and State of New York, have invented a new and Improved Automatic Multiple-Chuck Drill-Press, of which the following is a full, clear, and exact description.

This invention relates to improvements in drill presses and more particularly those used in metal work.

The primary object of the invention is to provide an automatic multiple chuck drill press in which either of the chucks or toolholding devices may be brought into successive coupling position to be rotated or operated from a single working spindle, the improvement being designed to be applied to machines which are now generally constructed, or to a machine having a specially mounted and driven spindle, as will be hereinafter described.

A further object of the invention is to provide a drill press of the character described which includes, in combination with a supporting standard and an arm carried thereby, a spindle rotatably carried by the arm and supported against undue friction, improved driving means for the spindle including means for tightening an endless drive member and for alining the laps thereof for different changes of speed, and a chuck-carrying magazine or casing movably carried by the arm, the spindles of the chucks having means coöperating with the working spindle, whereby upon shifting of the latter vertically, either one of the chuck spindles may be coupled thereto and rotated, thus permitting the use of a plurality of tools or implements upon the same machine with extreme simplicity of operation and convenience.

A still further object of the invention is to provide means for normally elevating the working spindle of the machine so as to uncouple the same with relation to the chuck spindles, and means for normally holding a shifting member for the magazine or casing in position to bring and hold one of the chuck spindles into coupling position, the latter being supported in close proximity to the working spindle for convenient coupling operation.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Fig. 14 is a fragmentary front elevation of the chuck magazine showing a spring detent for anchoring the movable part of the magazine when one of the chuck spindles is in coupling position.

Figures 1, 5, 6:
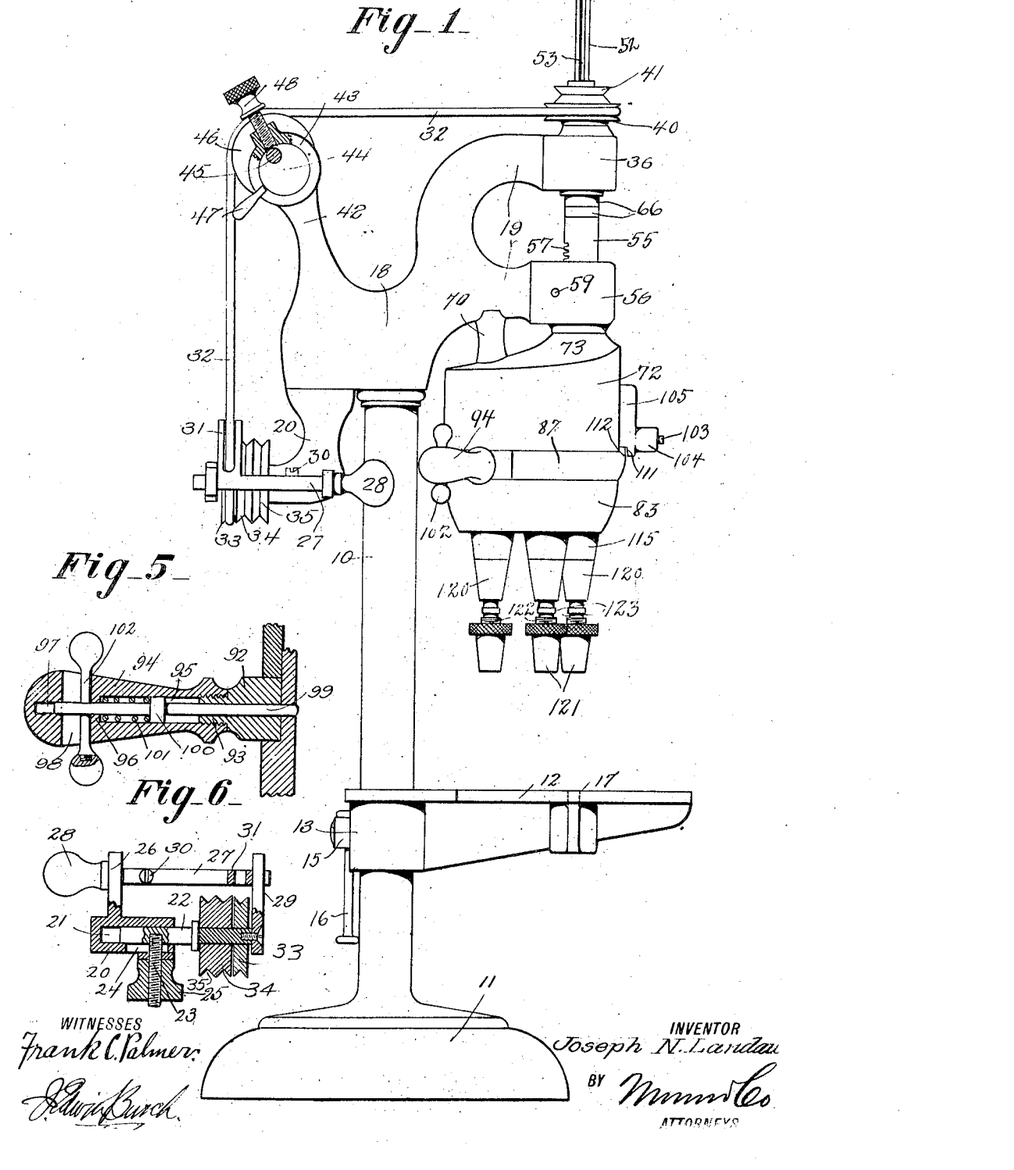
Figure 1 is a side elevation of my improved automatic multiple chuck drill press.
Fig. 5 is an enlarged vertical sectional view of an arm for turning the chuck magazine and for holding the latter normally against movement.
Fig. 6 is an enlarged horizontal sectional view partly in elevation of the alining device and belt shifter.

In the drawings the numeral 10 indicates the supporting pedestal or standard of the improved drill press which is carried by or supported upon a base 11, the said standard carrying the vertically and laterally adjustable work support or table 12 having a split sleeve portion 13 provided with extensions 14 capable of being drawn into binding engagement with the standard through the instrumentality of a clamping screw 15 operable by a turning bar 16. This table is preferably of circular form in plan, as illustrated, and is provided with a central opening 17 through which the operating tools may be projected to prevent injury thereto.

Figures 2, 3, 10, 11, 12, 13:
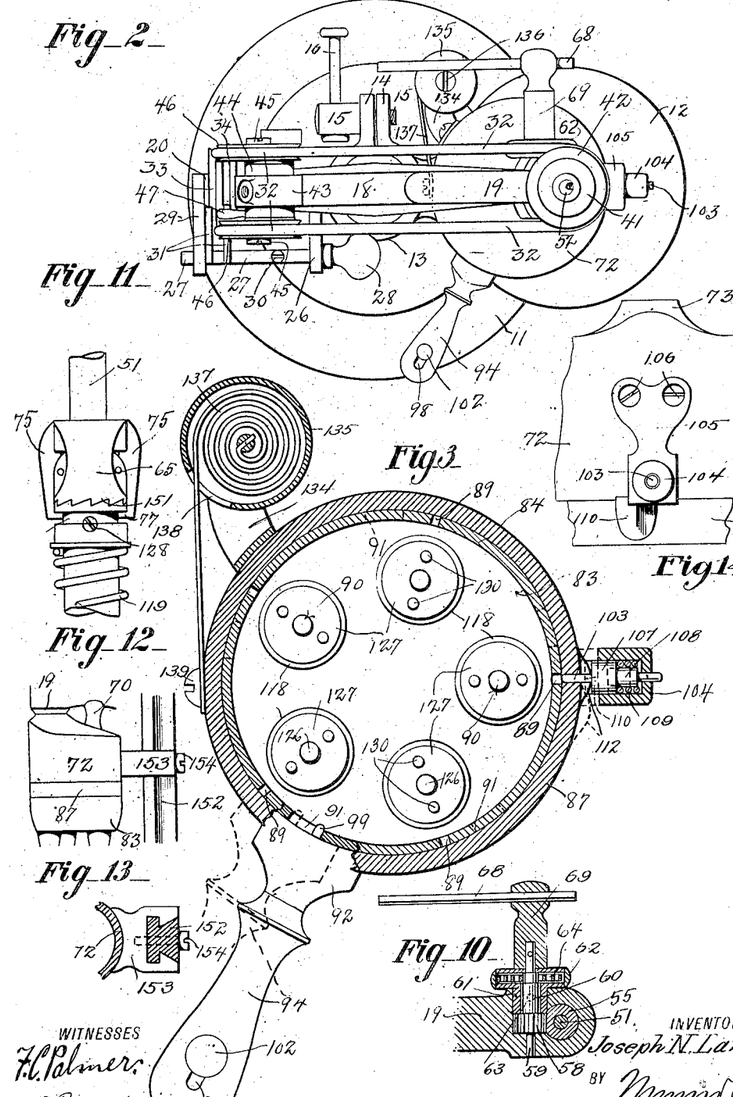
Fig. 2 is a plan view.
Fig. 3 is an enlarged cross sectional view taken through the magazine of the chuck holder and the means for holding the movable part of the magazine in its operative positions.
Fig. 10 is a horizontal sectional view through the casing shown in Fig. 7, the arm and means for raising and lowering the working spindle.
Fig. 11 is an elevation of fragmentary portions of the working spindle and a chuck spindle, showing a modified form of coupling device.
Fig. 12 is a fragmentary side elevation of a portion of the machine showing a modified manner of supporting the chuck magazine upon a modified form of standard.
Fig. 13 is a plan view of the structure illustrated in Fig. 12, a fragmentary portion of the magazine being shown in section.

Mounted on the upper end of the standard 10 is a head casting 18 which is provided with forwardly extending vertically spaced parallel bearing arms 19, such arms being disposed in horizontal position. The opposite side of the head is provided with a depending and laterally extending arm 20, in turn provided with a longitudinal bore 21, serving to support a stub shaft 22 for longitudinal adjustment. To accomplish this adjustment the stub shaft 22 removably carries a threaded stem 23 which extends laterally through a longitudinal slot 24 in the arm 20, there being a binding nut 25 engaged on the screw to hold the stub shaft in any position of longitudinal adjustment for a purpose to be hereinafter made apparent. At the opposite side of the arm 20 a bracket 26 is provided, said bracket having a square aperture receiving the square rectangular shank portion 27 and the belt-shifting rod having an operating head 28, the opposite end of the rod extending through a similar aperture of a bracket arm 29 fixed to the stub shaft 22, and being held against displacement relative to said bracket arm by a set screw or stop 30 carried by the shank adjacent to the operating head 28 but on the opposite side of the bracket 26. The shifting rod is also provided with an upwardly curved fork 31, between the tines of which one vertical lap of an endless drive member or belt 32 extends, the rod being designed to be shifted longitudinally for changing the position of the endless drive member with respect to a loose pulley 33 and a tight pulley 34 for throwing the machine into and out of operation. These pulleys are mounted upon the stub shaft and fixed to the pulley 34 is a pulley 35 around which a drive member is engaged from a suitable source of power for operating the machine.

Journaled in the bearing portion 36 of the uppermost of the arms 19 is a sleeve 37, the same having a peripheral groove 38 receiving the inner extremity of a set screw 39 engaged through the bearing portion, and this sleeve in turn is provided above the bearing portion with a large pulley 40 and a small pulley 41, preferably formed integral with the sleeve and designed to be rotated by engagement of the endless drive member 32 there-around. The small pulley is designed for increasing the speed of rotation of the sleeve and working parts fixed to the latter, as will be hereinafter described, while the pulley 40 is for a reduced speed, and since the pulleys are of different diameters, it is apparent that means must be provided for taking up the slack in the endless drive member 32, which latter is preferably of circular cross section. For this purpose the head 18 is provided with an upwardly and rearwardly extending arm 42 terminating in a bearing sleeve 43 in which a cylinder 44 is turnable, the said cylinder at its opposite ends having removably secured thereto, at eccentric points located in coincident relation, removable stub shafts 45 each carrying a grooved pulley 46. The laps of the belt or endless drive member 32 are passed around either of the pulleys 33 or 34 and then over the pulleys 46 and around either of the pulleys 40 or 41, depending upon whether the device is operative or inoperative and also the speed at which it is desired to rotate the working parts. The slack in the belt is taken up by turning the cylinder 44 to vary the degree of distention of the pulleys 46, such cylinder being capable of movement through the instrumentality of a rigid projection or arm 47 and capable of being held in adjustable position through the instrumentality of a set screw 48 operating through a boss in the bearing sleeve 43. During this adjustment the vertical laps of the endless drive member will be moved to either side of the vertical so that by adjusting the stub shaft 22 longitudinally in the manner heretofore described, the pulleys 33 or 34 may be brought directly beneath the peripheral portions of the pulleys 46 contacted by the endless drive member and the laps thereby disposed in vertical alinement.

Figures 4, 7, 8, 9:
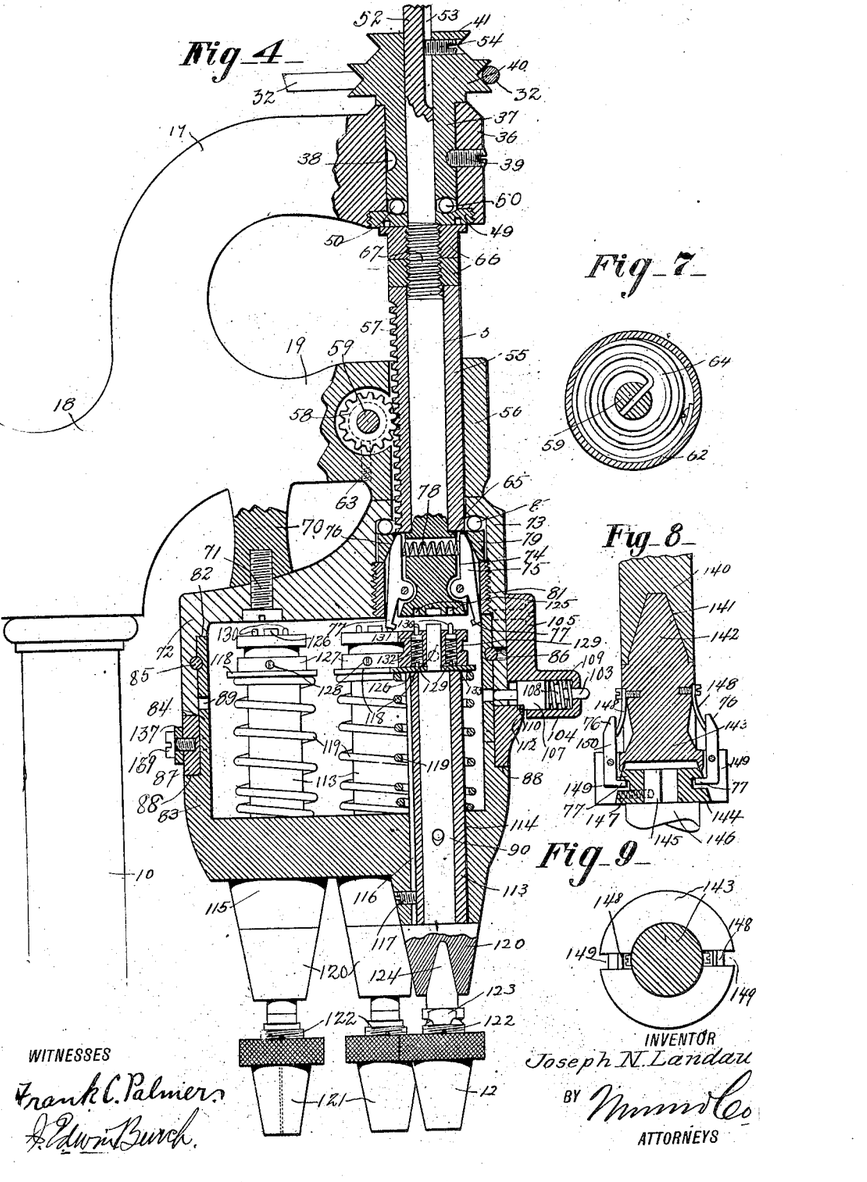
Fig. 4 is an enlarged fragmentary vertical sectional view of the upper part of the machine with a part of the standard and the head and arm of the latter in elevation, the spindles being uncoupled.
Fig. 7 is a vertical sectional view through a casing containing the spring for normally holding the working spindle elevated, the shaft disposed in mesh with the spindle being also shown in section.
Fig. 8 is an enlarged vertical sectional view of fragmentary portions of the working spindle and a chuck spindle, showing a modified form of coupling means therefor.
Fig. 9 is a plan view of the parts illustrated in Fig. 8.

From Fig. 4 of the drawings it will be observed that the sleeve 37 is enlarged to support it for rotation upon the upper bearing 36, but in order to positively support the sleeve for rotation against undue friction, a bearing seat 49 is removably secured in the lower end of the bearing 36, as by threading the same thereinto, interposed ball bearings 50 being mounted on the support and between the latter and the lower end of the sleeve 37, so as to rotatably support the latter.

The main operating or working spindle of the machine is indicated by the numeral 51, and has a reduced upper portion 52 extended through the sleeve 37, in turn provided with a longitudinal keyway 53 engaged by a set screw 54 disposed at a convenient place through an integral part of the sleeve 37, as for instance through the pulley 41, as illustrated. This screw engages in the keyway 53 and permits vertical adjustment of the spindle independently of the sleeve but causes the former to rotate with the latter when the machine is in operation.

Fitted on the spindle 51 is a tube 55 snugly operating in the bearing 56 of the lower arm 19 and having on its inner side a plurality of teeth 57 forming a rack bar for engagement by a pinion 58 carried by a shaft 59 horizontally journaled through the bearing 56, said shaft having an enlarged portion 60 for rotation within a sleeve 61 extending inwardly from a relatively flat cylindrical casing 62 held in fixed relation to the bearing 56 by means of a set screw 63 extending upwardly through the bearing or otherwise passed through the latter and engaging the sleeve extension 61. This casing 62 carries a coiled spring 64 which is fixed to its inner face, and which is also fixed to the shaft 59 in some manner, such as illustrated in Fig. 7 of the drawings, whereby the spring normally tends to elevate the tube 55 and the working spindle 51 carried thereby. This latter operation may be effected owing to the fact that the lower end of the spindle is enlarged, as shown at 65, to provide a shoulder upon which the lower end of the tube rests and is held against downward displacement, while a pair of jam nuts 66 is mounted on the threaded portion 67 of the spindle to abut the upper end of the tube and resist upward displacement of the latter independent of the spindle; but it is apparent that by rotation of an operating bar 68, which is fixed to the shaft 59 through the instrumentality of a socket head 69, the shaft and pinion 58 carried thereby may be rotated in mesh with the rack 57 so as to positively raise or lower the spindle.

The head 18 is provided with a depending stem 70, and carried by this stem or removably secured thereto by an attaching screw 71, is the stationary section 72 of a magazine or casing, the same having a neck portion 73 abutting the lower edge of the bearing 56, such neck portion being interiorly hollowed out for receiving the lower end of the operating spindle 51 therethrough. The lower end of the spindle, as shown in Fig. 4 of the drawings, is slightly enlarged in diameter below the tube 55, and is provided at diametrically opposite points with vertical recesses 74 in which a pair of coupling pawls 75 are pivoted intermediate their ends, the upper ends of the pawls being beveled at their outer edges, as shown at 76, while the lower ends of the pawls are provided with inward extensions 77 normally held toward each other by means of a coiled spring 78 mounted in a transverse bore through the spindle connecting the pawls, so as to exert outward pressure against the upper portions of the latter.

The engaging portions 77 of the pawls are held out of operative position when the spindle is elevated, and for this purpose a split ring 79 of wedge-shaped cross section is fitted in the hollowed-out part of the neck portion 73 with ball bearings 80 between its upper edge and a shoulder formed by said hollowed-out portion, the wedge-shaped cross section of the ring providing an interior beveled face sloping outwardly and downwardly, whereby when the spindle is raised the beveled ends 76 of the pawls will be brought into engagement with the ring and forced toward each other against the action of the coiled spring 78, constituting resilient means for normally holding said ends outward. During this movement the friction due to the contact of the parts is taken up by the ball bearings 80, and since the ring 79 is free to rotate within the neck portion of the magazine or casing 72, the spindle, together with the pawls carried thereby, will rotate without undue friction. The bearings 80 and the ring 79, which is preferably of hardened steel, are held in position by a bushing 81 threaded into the hollowed-out portion or neck of the stationary section of the magazine from the under side, such bushing contacting with the ring and supporting the latter and the bearings. The stationary section of the magazine below said neck portion is hollowed out to provide a surrounding wall and an interior shoulder 82 facing downward, and said stationary section receives a movable section 83 which has a reduced upper portion 84 snugly fitted therein and contacting at its upper edge with the shoulder 82. These parts are keyed for independent movement so as to prevent displacement of the movable section 83 downwardly, such as by means of a coupling ring 85 fitted in co-acting grooves in the contacting faces of the stationary and movable sections of the magazine, such coupling ring being fitted endwise into position after the parts are assembled in the manner described, through an opening 86 in the front part of the stationary section.

Rotatably fitted on the reduced upper portion 84 of the movable section is an operating band 87, such band being disposed between the lower edge of the stationary section and a shoulder 88 formed by the reduced portion 84, and which holds the support for the band as shown in Fig. 4 of the drawings. The band is designed for turning the movable section 83 of the magazine to bring either end of a plurality of chuck spindles into vertical alinement with the working spindle to be coupled to the latter, and for this purpose the reduced portion 84 is provided at equi-distantly spaced points, slightly above the upper edge of the band 87, with circular apertures or openings 89 corresponding to the number of chuck spindles carried by the magazine, and located on radial lines coincident with the centers of such chuck spindles, which are indicated by the numeral 90.

The reduced portion 84 is further provided at equi-distantly spaced points with horizontally disposed elongated slots 91, centrally located with respect to the width of the band and to one side of the openings 89 or the centers of the chuck spindles in the direction of movement of the movable section of the magazine, and in the present instance in an anti-clockwise direction. The band carries a radially extending apertured stud 92 having a reduced exteriorly threaded portion 93 to which an operating handle 94 is threaded by means of a correspondingly interiorly threaded bore, and said handle is provided with a smooth longitudinal bore 95 having an end wall 96, but provided, through a restricted aperture terminating in a socket or counterbore 97, with communication with relation to a vertical slot 98 extending through the handle near its free end. A pin 99 is movable longitudinally through the handle and the aperture in the stud 92, and this pin is provided with an enlarged portion 100 by which it is guided in the enlarged counterbore 95, there being a coiled spring 101 disposed in the counterbore between the end wall and the enlargement to normally force the pin into one of the elongated slots 91, while the outer end of the pin is guided in the socket 97.

Connected with the pin 99 and operating in the slot 98 is a grasping bar 102, the same having enlarged end portions to be engaged by two of the fingers for releasing the pin from one of the slots 91 against the action of the spring 101 by exerting pressure on the handle with the thumb and pulling outwardly on the bar 102 with the first fingers, thereby permitting the band to turn independently of the movable section of the magazine. Coöperating with the apertures 89 is a spring detent 103, the same being mounted in a barrel 104 formed at the lower end of a bracket 105 secured to the front portion of the stationary section of the magazine at two points, as shown at 106, so as to hold the same from lateral swing. The barrel 104 is provided with a reduced end aperture through which the outer end of the detent operates, and such detent is provided with an enlarged portion 107 snugly fitted in the counterbore of the barrel and further provided with a reduced portion 108 around which a coiled spring 109 is disposed, so as to exert pressure between the end wall of the barrel and the shoulder formed by the enlargement 107, and thus hold the detent engaged with one of the apertures 89 through an alined aperture in the stationary section of the magazine, thus tending to hold the movable section against rotation with respect to the stationary section of the magazine.

To permit rotation of the movable section, the enlarged portion 107 of the detent at its lower portions is notched to provide a cam surface 110, and an adjacent portion of the bracket or barrel of the latter is also notched, as shown at 111, to accommodate a cam projection 112 carried by the band 87 and extending upwardly in front of the stationary section of the magazine. This cam projection is normally disposed to the left of the detent 103, and the pin 99 is engaged in one of the slots 91 in the position shown in Figs. 1, 2 and 3 of the drawings, so that it will be apparent that the handle 94 may be shifted to move the pin 99 in the slot 91, whereby the band will turn independently of the movable section of the magazine, and by causing the cam projection 112 to engage with the cam face of the detent, exert outward pressure against the enlargement of the latter and thereby disengage the detent from the adjacent aperture 89 in the movable section of the magazine. This operation is indicated more particularly in Fig. 3, the parts being shown in the initial position in dotted lines and in the shifted position in solid lines after the detent is disengaged from the adjacent aperture, whereby movement of the movable section with the band, upon further rotation of the latter through the instrumentality of the handle 94, will be permitted to bring the next chuck spindle in alinement with the working spindle 51. When the parts are shifted in this position any one of the chuck spindles may be used, and from the drawings it will be seen that the chuck spindles are mounted in an arc concentric with relation to the center of the movable section of the magazine, which is in the form of a shell or casing open at its upper end. These spindles are rotatably journaled in sleeves 113, each of which is mounted in a coacting vertical aperture 114 in the lower wall of the movable section of the magazine, and depending bosses 115 carried by or formed with the latter and corresponding in number to the number of chucks and chuck spindles desired to be used. These sleeves are splined in position to prevent their rotation but to permit them to be freely adjusted vertically, the sleeves being provided with longitudinal keyways 116 each receiving a key or set screw 117 engaged through each boss and seated in a keyway. Mounted on the upper ends of the sleeves 114 are bearing plates or washers 118 which are fixed to the sleeves, and by means of coiled springs or other supporting means 119 encircling the sleeves, resting on the bottom wall of the movable section and exerting upward pressure against said supporting plates or washers, the chuck spindles are held upwardly displaced, and chuck-receiving enlargements 120, formed at the lower ends of the spindles and tapered in conformity to the bosses 115, are held in contact with the lower edges of the bosses.

The tool-holding devices or chucks are indicated by the numeral 121, and are of such types as to hold various forms of tools, each chuck constituting a tapered sleeve having a knurled turning portion engaged on a tapered and split exteriorly threaded bushing 122, the shank portion of each bushing being flattened, as shown at 123, whereby it may be held stationary by means of a wrench or other implement to permit turning of the sleeve with respect thereto in holding or releasing a tool. The shanks of the chucks are tapered, as shown at 124, and are wedged in tapered sockets in the lower ends of the enlargements 120 of the chuck spindles, whereby they are securely held in position. In order to couple each of the chuck spindles with the working spindle, when the former are brought into successive vertical alinement with the working spindle, said working spindle and chuck spindles are provided with co-acting or clutch heads in addition to the pawls 75 heretofore referred to.

In the form of coupling shown in Fig. 4, the lower extremity of the working spindle is provided with a pair of sockets 125, and the upper extremity of each chuck spindle is provided with a circular reduced portion 126 to which is fixed a coupling head 127, as by means of a set screw 128, and each head is provided with a peripheral groove 129 adapted, when the working spindle is depressed by the rack means heretofore described, to be engaged by the extensions 77 of the pawls under the action of the springs 78 tending to spread the upper ends of the pawls and thus move the engaging portions 77 together. This means provides for either one of the chuck spindles to be retained in coöperative engagement with the working spindle but does not provide for simultaneous rotation of the two when the working spindle is rotated. However, for this purpose each head 127 is provided with a plurality, preferably a pair, of vertical passages 129 having a restricted upper end through which coupling pins 130 are projected, said coupling pins having enlarged portions 131 operating in the passages and normally held upwardly disposed by means of coiled springs 132, there being adjusting screws 133 operating in the lower ends of the passages within the area of the plates or washers 118 to adjust the tension of the springs and the degree of engagement of the pins 130 with the similarly located sockets 125 in the lower extremity of the working spindle. In this position of the parts, a chuck spindle may be rotated and depressed with the working spindle, supported by the pawls 75, but after a chuck spindle has been brought into vertical alinement with the working spindle the pin 99 is disengaged from the adjacent slot 91, and with the band and handle, is automatically turned to its initial position, whereby the next chuck spindle may be similarly positioned. For this purpose an angular bracket 134 is secured to the stationary section of the magazine to the opposite side of the head with respect to the initial position of the handle 94, and such bracket forms a support for a cylindrical casing 135 which is removably attached thereto by a clamping screw 136, such clamping screw also forming an anchoring means for one extremity of the band spring 137 coiled within the casing. The free extremity of the spring operates through a slot 138 in the casing and is anchored to the band 87, as shown at 139. Thus, when the band is rotated through the instrumentality of the operating handle 94, and the cam projection 112 causes the disengagement of the detent 103 with respect to the adjacent aperture 89, further rotation of the band due to the contact of the pin 99 with the end wall of its engaged slot 91, will cause movement of the cam projection 112 beyond the detent, whereby the spring 109 will cause the same to engage in the next aperture 89 and hold the movable section of the magazine against movement. Next, the pin 99 is disengaged from its slot 91, and under tension of the spring 137, which has been drawn around with the band and caused to wind within the casing, the band will be returned with the handle to its initial position, and under the action of the coiled spring 101 the pin will automatically engage the next slot 91, and this operation may be continued in a like manner for presenting either one of the chucks into position to be coupled with the working spindle, depending upon the particular work to be effected.

In order to adapt the coupling device to machines of ordinary design, in contra-distinction to a machine having a special form of working spindle, the structure shown in Fig. 8 is provided. The working spindle is indicated by the numeral 140, and in its lower end is provided with a tapered socket 141 receiving the tapered upper extremity 142 of a coupling head 143 corresponding to the enlargement of the working spindle 51. In connection with this construction, the coupling means heretofore described may be employed, but as a modified form of coupling means the head 143 has its lower end formed with a tapered section receiving a tapered head 144 secured to the squared end 145 of a chuck spindle 146, as by means of a set screw 147, and the neck portion of the head 143 is provided with leaf springs 148 at diametrically opposite points, secured at their upper ends to such neck portion, as by means of screws as illustrated, and these springs have their lower free end extending outwardly. At diametrically opposite points of the head, corresponding to the relative positions of the springs 148, such head is provided with slots 149 in which pawls 150 are pivoted and provided with engaging portions similar to the pawls 75. The springs normally cause the pawls to seat in a peripheral groove in the tapered head 144 of the chuck spindles, whereby the heads are coupled, but when the working spindle is shifted vertically such pawls are disengaged from the groove against the action of the springs 148 and thus uncoupling the working spindle whereby another of the chuck spindles may be brought to coupling position.

A modified form of coupling is shown in Fig. 11 of the drawings, wherein the parts are the same as illustrated in Fig. 4 except that the co-acting faces of the clutch heads instead of being provided with sockets 125 and coupling pins 130, are provided with co-acting rigid clutch faces 151.

In Figs. 12 and 13 of the drawings a construction is shown whereby the magazine is adapted for use with an ordinary drill in continuation of the purpose for which the structure shown in Fig. 8 is provided. In these figures the magazine is of ordinary construction, but the standard 152 is provided upon opposite sides with triangular grooves producing a dovetailed member designed for slidable engagement by a bracket arm 153 which supports the magazine and permits adjustment thereof upon the standard. In this construction the magazine is held in an operative position by engagement of a clamping screw 154 through the spindle and the bracket arm 153.

From the foregoing description, in connection with the accompanying drawings, it will be apparent that I have provided a drill press which possesses points of advantage both in simplicity of structure and operation, as well as durability, it being obvious that the speed of rotation of the working spindle may be quickly changed and the changes in the position of the working member or tool readily compensated for, while the spindle is supported for rotation in a simple and novel way against undue friction and yet permitted to be adjusted vertically by the rack means provided, which normally holds the spindle in an elevated position and causes the automatic separation of the coupling pawls by which a chuck spindle may be coupled to the working spindle for the working operation. Further advantage is derived by reason of the provision of a plurality of chucks and the structure by which the device may be applied to machines as now constructed or those having a special form of head and working spindle, as well as the provision of a mechanism carrying a plurality of chuck spindles and chucks for holding a number of tools which may be successively used in a particular piece of work or in different types of work without requiring changing of the tools with inconvenience and loss of much time. Further advantage is derived by reason of the automatic return of the shifting band to an operative position after having been released by the operator without requiring the operator to move from his work, thus assisting in the presentation of a particular chuck into coupling position, while particular coupling means provided permits the raising and lowering of the tool to engage or disengage the work, and especially when used for tapping, wherein reverse rotation may be imparted to the chuck spindle for withdrawing a tapping tool from the work operated on.

Having thus described my invention, what I claim as new and desire to secure by Letters Patent is:—

1. An automatic drill press embodying the combination with a supporting standard and a work support; of a head carried by the standard and having a pair of vertically spaced horizontal bearing arms projecting therefrom, sleeves carried by the arms, a spindle rotatably journaled in said sleeves, means for rotating the spindle, a chuck spindle supported beneath the aforesaid spindle and adapted to receive a working tool, means associated with one of the sleeves for normally shifting the first-named spindle upwardly, means operable against the action of said last-mentioned means to shift the spindle downwardly, and coupling means for said spindles, said coupling means being normally inoperative when the first-named spindle is raised and operative when the spindle is lowered.

2. In a multiple chuck drill press, the combination with a supporting standard and a work support carried thereby; of a head carried by the standard and having bearing arms projecting therefrom, a spindle rotatably journaled in said arms, means for rotating the spindle, a closed magazine supported beneath said spindle and comprising a casing disposed horizontally at right angles to the spindle, a plurality of chuck-carrying devices carried by said magazine and shiftable with a portion of the latter to present either one of said devices in alinement with said spindle, and means for coupling said spindle with either one of said devices.

3. In a multiple chuck drill press, the combination with a supporting standard; of a head carried by the standard and having bearing arms, a spindle rotatably journaled in said arms and adapted for reciprocation, means for rotating the spindle, a magazine supported beneath said spindle, a plurality of chuck-carrying devices carried by said magazine and shiftable to present either one of said devices in alinement with said spindle, each device having a spindle adapted for reciprocation and provided with a clutch head at its upper end and each head having a peripheral groove, the aforesaid spindle having a co-acting clutch head, and spring pawls carried by said latter head and actuated by reciprocation of its spindle for engagement with said grooves to hold the spindles against separation longitudinally when the heads are coupled.

4. In a multiple chuck drill press, the combination with a supporting standard and a work support carried thereby; of a head carried by the standard and having bearing arms projected therefrom, a movable spindle rotatably journaled in said arms, means for rotating the spindle, a magazine supported beneath said spindle, a plurality of chuck-carrying devices carried by said magazine and shiftable to present either one of said devices in alinement with said spindle, each device embodying a spindle movable in the magazine, means to connect each latter spindle with said first-named spindle, means for preventing independent rotation or longitudinal separation of the spindles when connected, and means for supporting the spindles of said devices, whereby said spindles and the chucks carried thereby may be depressed with the first-named spindle.

5. In a multiple chuck drill press, the combination with a supporting standard and a work support carried thereby; of a head carried by the standard and having bearing arms projected therefrom, a longitudinally shiftable spindle rotatably journaled in said arms, means for rotating the spindle, a magazine supported beneath said spindle, a plurality of chuck-carrying devices carried by said magazine and shiftable to present either one of said devices in alinement with said spindle, each device embodying a spindle movable in the magazine, means for connecting the spindles when the same are in contact, means for preventing independent rotation or longitudinal separation of the spindles when connected, and means for supporting the spindles of said devices, whereby said spindles and the chucks carried thereby may be depressed with the first-named spindle, said last named means normally holding said chuck spindles elevated.

6. The combination with the working spindle of a drill press; of a casing supported in juxtaposition to said spindle, said casing comprising a stationary part and a movable part, a plurality of chuck-holding devices carried by the movable part of said casing, and means whereby either of said devices may be brought into coupling position with relation to the spindle.

7. The combination with the working spindle of a drill press; of a closed circular casing supported in juxtaposition to said spindle and comprising a movable and a stationary part, a plurality of chuck-holding devices carried by the movable part of said casing concentric to the center thereof, said casing being rotatably supported, means for holding the movable part against movement when one of the said devices is in alinement with the working spindle, said means being carried by the stationary part and engageable with the movable part, and means operated upon the depression of the working spindle to couple the alined devices.

8. The combination with the working spindle of a drill press; of a casing supported in juxtaposition to said spindle, a plurality of chuck-holding devices carried by said casing, said casing being rotatably supported, means carried by a stationary part and engageable with the casing, for holding the casing against rotation when one of the said devices is in alinement with the working spindle, and means operated upon movement of the working spindle in an operative direction to couple the alined devices.

9. The combination with the working spindle of a drill press; of a casing supported in juxtaposition to said spindle, a plurality of chuck-carrying devices carried by said casing, said casing being rotatably supported, means for holding the casing against movement when one of the said devices is in alinement with the working spindle, means whereby the casing may turn each device and the working spindle having co-acting clutch heads, means for locking said heads successively with respect to a single chuck-carrying device, and means normally returning said casing turning means to its initial position.

10. In a multiple chuck drill press, a standard suitably supported, a head carried by said standard and provided with a plurality of bearing arms, a working spindle carried by certain of said arms, drive means carried by the spindle and the other of said arms for rotating the spindle, a magazine having a hollowed-out neck portion receiving the lower end of the spindle, a beveled ring carried by said neck portion, bearings carried by one of said arms and in said neck portion, means for adjusting the spindle vertically, said bearings taking the end thrust of said adjustments, a plurality of tool carrying spindles rotatably supported with respect to the magazine and adapted to be independently arranged beneath the spindle, spring means for securing a tool carrying spindle against downward displacement relative to the first named spindle and means whereby said spindles will rotate as one upon rotation being imparted to the first named spindle.

11. In a multiple chuck drill press, a standard suitably supported, a head carried by said standard and provided with a plurality of bearing arms, a working spindle carried by certain of said arms, drive means carried by the spindle and the other of said arms for rotating the spindle, a magazine having a hollowed-out neck portion receiving the lower end of the spindle, a beveled ring carried by said neck portion, bearings carried by one of said arms and in said neck portion, a bearing sleeve fixed to the spindle, said sleeve being movable in the lowermost of said bearing arms in which the spindle is journaled and provided with a rack at one side, a shaft journaled in said bearing arms and having a pinion meshing with said rack, means for rotating the shaft to adjust the spindle vertically, a plurality of tool-carrying spindles rotatably supported with respect to the magazine and adapted to be independently arranged beneath the working spindle, spring means for securing the tool-carrying spindles against downward displacement relative to the first named spindle when in the position named and means to cause simultaneous rotation of the working spindle and the tool-carrying spindles upon rotating being imparted to the working spindle.

12. In a multiple chuck drill press, a standard suitably supported, a head carried by said standard and provided with a plurality of bearing arms, a working spindle carried by certain of said arms, drive means carried by the spindle and the other of said arms for rotating the spindle, a magazine having a hollowed-out neck portion receiving the lower end of the spindle, a beveled ring carried by said neck portion, bearings carried by one of said arms and in said neck carried by one of said arms and in said neck portion, a bearing sleeve fixed to the spindle, said sleeve being movable in the lowermost of said bearing arms in which the spindle is journaled and provided with a rack at one side, a shaft journaled in said bearing arms and having a pinion meshing with said rack, a spring suitably anchored and connected to the shaft for positively rotating the same and to raise the spindle, a movable section carried by the magazine and chuck carrying spindles carried by the movable section and adapted to be independently arranged beneath the working spindle, said latter spindles being located on the same horizontal plane.

13. In a multiple chuck drill press, a standard suitably supported, a head carried by said standard and provided with a plurality of bearing arms, a working spindle carried by certain of said arms, drive means carried by the spindle and the other of said arms for rotating the spindle, a circular casing supported adjacent to the spindle and comprising a stationary section having a hollowed-out neck portion receiving the lower end of the spindles, a movable section rotatably carried by the stationary section, chuck spindles carried by the movable section, a band movable on the movable section, means carried by the band for engaging the movable section at spaced points for causing a partial rotation of the latter and means for locking the spindle with the chuck spindles arranged there-beneath.

14. In a multiple chuck drill press, a standard suitably supported, a head carried by said standard and provided with a plurality of bearing arms, a working spindle carried by certain of said arms, drive means carried by the spindle and the other of said arms for rotating the spindle, a circular casing supported adjacent to the spindle and comprising a stationary section having a hollowed-out neck portion receiving the lower end of the spindles, a movable section rotatably carried by the stationary section, chuck spindles carried by the movable section, a band movable on the movable section, means carried by the band for engaging the movable section at spaced points for causing a partial rotation of the latter, spring means for returning the band to its initial position upon release of the said shifting means and means for locking the spindle with the chuck spindles arranged there-beneath.

15. The combination with the working spindle of a drill press and a movable support arranged there-beneath; of a plurality of sleeves carried by the support, said sleeves being adapted for vertical movement but held against rotation, spindles journaled in said sleeves, a coupling head fixed to the upper end of each spindle, the working spindle and each of the last-named spindles having co-acting coupling faces, pawls pivoted at opposite faces of the working spindle, each head having a groove for engagement by said pawls, spring means carried by the working spindle to exert outward pressure against the upper ends of the pawls to cause their lower ends to engage the groove of one of the spindle heads and means to disengage the spindles.

16. The combination with the working spindle of a drill press adapted for vertical adjustment and a movable support arranged there-beneath; of a plurality of sleeves carried by the support, said sleeves being adapted for vertical movement but held against rotation, spindles journaled in said sleeves, a coupling head fixed to the upper end of each spindle, the working spindle and each of the last-named spindles having co-acting coupling faces, pawls pivoted at opposite faces of the working spindle, each head having a groove for engagement by said pawls, spring means carried by the working spindle to exert outward pressure against the upper ends of the pawls to cause their lower ends to engage the grooves of one of the spindle heads, and means carried by said support to cause the upper ends of the pawls to move toward each other against the action of the spring means, whereby the lower ends thereof will be released upon raising of the working spindle.

17. The combination with the working spindle of a drill press and a movable support arranged there-beneath; of a plurality of sleeves carried by the support, said sleeves being adapted for vertical movement but held against rotation, spindles journaled in said sleeves, a coupling head fixed to the upper end of each spindle, the working spindle and each of the last-named spindles having co-acting coupling faces, pawls pivoted at opposite faces of the working spindle, each head having a groove for engagement by said pawls, spring means carried by the working spindle to exert outward pressure against the upper ends of the pawls to cause their lower ends to engage the groove of one of the spindle heads, the lower ends of the spindles having enlarged portions, and chucks carried by said enlarged portions.

18. The combination with the working spindle of a drill press and a movable support arranged there-beneath; of a plurality of sleeves carried by the support, said sleeves being adapted for vertical movement but held against rotation, spindles journaled in said sleeves, said support comprising a stationary section receiving the working spindle and a movable section carrying the last-named spindles, said movable section being hollowed out, and means arranged within the movable section for normally elevating the spindles for operative engagement with the working spindle.

19. The combination with the working spindle of a drill press and a movable support arranged there-beneath; of a plurality of sleeves carried by the support, said sleeves being adapted for vertical movement but held against rotation, spindles journaled in said sleeves, said support comprising a stationary section receiving the working spindle and a movable section carrying the last-named spindles, said movable section being hollowed out, means arranged within the movable section for normally elevating the spindles for operative engagement with the working spindle, said movable section having depending bosses in which the sleeves are mounted as described, enlargements at the lower ends of the spindles conforming to the contour of the bosses, and chucks carried by said enlargements.

20. The combination with the working spindle of a drill press and a movable support arranged there-beneath; of a plurality of sleeves carried by the support, said sleeves being adapted for vertical movement but held against rotation, spindles journaled in said sleeves, said support comprising a stationary section receiving the working spindle and a movable section carrying the last-named spindles, said movable section being hollowed out, plates at the upper ends of the sleeves, and springs encircling the sleeves between the movable section of the support and the plates to hold the spindles resiliently elevated and permitting them to be depressed with the working spindle.

21. In a multiple chuck drill press, a standard suitably supported, a head carried by said standard and provided with a plurality of bearing arms, a working spindle carried by certain of said arms, drive means carried by the spindle and the other of said arms for rotating the spindle, a circular casing supported adjacent to the spindle and comprising a stationary section having a hollowed-out neck portion rotatably carried by the stationary section, chuck spindles carried by the movable section, a band movable on the movable section, means carried by the band for engaging the movable section at spaced points for causing a partial rotation of the latter, means carried by the stationary section and engaging the movable section to hold the latter against movement when shifted, said means being releasable upon subsequent operation of said shifting means and means for locking the working spindle with either of the chuck spindles.

22. In a multiple chuck drill press, a supporting frame, a spindle journaled in the frame, a circular casing supported adjacent to the spindle and comprising a stationary section having a portion thereof receiving one end of the spindle, a movable section rotatably carried by the stationary section, a band movable on the movable section and stationary section, said movable section having a plurality of equi-distantly spaced apertures, chuck carrying spindles supported concentrically in the movable part of the casing, co-acting coupling means carried by the spindles first and last mentioned, a spring detent carried by the stationary section and engageable through the latter to enter any one of said apertures of the movable section and hold the latter normally against movement and a projection carried by the movable section to disengage the detent upon shifting of the movable section.

In testimony whereof I have signed my name to this specification in the presence of two subscribing witnesses.

JOSEPH N. LANDAU.

Witnesses:
  John E. Burch,
  Philip D. Rollhaus.